US009039186B2

(12) United States Patent
Yanai et al.

(10) Patent No.: US 9,039,186 B2
(45) Date of Patent: May 26, 2015

(54) PROJECTOR HAVING TILTED TRANSMISSIVE SUBSTRATE AND MULTICOLOR PIXEL MODULATOR

(75) Inventors: Hiroaki Yanai, Matsumoto (JP); Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 300 days.

(21) Appl. No.: 13/348,030

(22) Filed: Jan. 11, 2012

(65) Prior Publication Data

US 2012/0200830 A1    Aug. 9, 2012

(30) Foreign Application Priority Data

Feb. 3, 2011   (JP) ................. 2011-021448

(51) Int. Cl.
| | |
|---|---|
| G03B 21/00 | (2006.01) |
| G03B 21/20 | (2006.01) |
| G03B 21/28 | (2006.01) |
| H04N 9/31 | (2006.01) |
| G03B 33/12 | (2006.01) |

(52) U.S. Cl.
CPC .............. *H04N 9/3105* (2013.01); *G03B 21/28* (2013.01); *G03B 21/208* (2013.01); *H04N 9/3152* (2013.01); *H04N 9/3197* (2013.01); *G03B 21/2066* (2013.01); *G03B 21/00* (2013.01); *G03B 33/12* (2013.01)

(58) Field of Classification Search
CPC .... G03B 21/00; G03B 21/005; G03B 21/006; G03B 21/14; G03B 21/208; G03B 21/2093; G03B 21/28; H04N 9/31; H04N 9/3105; H04N 9/3108; H04N 9/315; H04N 9/3152; H04N 9/3167; H04N 9/3197; G02B 27/09; G02B 27/0938; G02B 27/095; G02B 27/0972; G02B 27/40; G09G 3/3607
USPC ............ 353/20, 22, 30–31, 33, 81, 94; 349/9, 349/106–109; 345/88–89; 348/761; 359/245, 250, 253, 259
See application file for complete search history.

(56) References Cited

U.S. PATENT DOCUMENTS

| | | | | |
|---|---|---|---|---|
| 5,389,982 | A * | 2/1995 | Lee | 353/37 |
| 5,539,580 | A | 7/1996 | Kim | |
| 5,642,176 | A * | 6/1997 | Abukawa et al. | 349/106 |
| 6,343,864 | B1 * | 2/2002 | Tajiri | 353/20 |
| 6,390,626 | B2 * | 5/2002 | Knox | 353/20 |
| 7,256,855 | B2 * | 8/2007 | Baek | 349/144 |
| 7,791,689 | B2 * | 9/2010 | Wang | 349/106 |

(Continued)

FOREIGN PATENT DOCUMENTS

| | | |
|---|---|---|
| JP | A-07-270682 | 10/1995 |
| JP | A-10-142605 | 5/1998 |

(Continued)

*Primary Examiner* — Jori S Reilly-Diakun
(74) *Attorney, Agent, or Firm* — Oliff PLC (57) ABSTRACT

A projector includes: a light source device; a light modulation device adapted to modulate a light beam emitted from the light source device; a light transmissive substrate adapted to transmit the light beam modulated by the light modulation device; and a projection optical device adapted to project the light beam transmitted through the light transmissive substrate, wherein the light modulation device includes a first light modulation unit having a plurality of pixels arranged, the pixels having colors different from each other, and the light transmissive substrate is disposed so as to be tilted with respect to an imaginary plane perpendicular to a light axis of the light beam modulated by the first light modulation unit.

5 Claims, 7 Drawing Sheets

(56) References Cited

U.S. PATENT DOCUMENTS

| | | | |
|---|---|---|---|
| 2006/0133090 A1* | 6/2006 | Noh et al. | 362/294 |
| 2010/0110383 A1* | 5/2010 | Tang | 353/8 |
| 2010/0171928 A1* | 7/2010 | Huang | 353/20 |
| 2011/0080534 A1* | 4/2011 | Perng et al. | 349/9 |

FOREIGN PATENT DOCUMENTS

| | | |
|---|---|---|
| JP | A-2000-298308 | 10/2000 |
| JP | A-2005-208488 | 8/2005 |
| JP | A-2008-170762 | 7/2008 |
| JP | A-2009-265549 | 11/2009 |

* cited by examiner

PROJECTOR HAVING TILTED TRANSMISSIVE SUBSTRATE AND MULTICOLOR PIXEL MODULATOR

BACKGROUND

1. Technical Field

The present invention relates to a projector.

2. Related Art

In the past, there has been known a projector provided with a light source device, a light modulation device for modulating a light beam emitted from the light source device to thereby form image light, and a projection optical device for projecting the image light formed by the light modulation device. Further, there has been known a projector using a color liquid crystal display (LCD) as the light modulation device (see, e.g., JP-A-7-270682 (Document 1)).

In Document 1, there is disclosed a projector using a single-panel color LCD having the pixels of three colors of red (R), green (G), and blue (B).

For example, such a color LCD has a configuration of having a plurality of pixels arranged in a row direction and a column direction, and making the respective colors correspond to the respective pixels using a color filter having three colors of red (R), green (G), and blue (B) arranged regularly.

However, in the projector provided with the color filter, there arises a problem that the boundary between colors becomes conspicuous when displaying an image in an enlarged manner, which makes the image thus displayed unnatural.

SUMMARY

An advantage of some aspects of the invention is to provide a projector capable of making the color boundary inconspicuous to thereby display a preferable image.

An aspect of the invention is directed to a projector including a light source device, a light modulation device adapted to modulate a light beam emitted from the light source device, a light transmissive substrate adapted to transmit the light beam modulated by the light modulation device, and a projection optical device adapted to project the light beam transmitted through the light transmissive substrate, wherein the light modulation device includes a first light modulation unit having a plurality of pixels arranged, the pixels having colors different from each other, and the light transmissive substrate is disposed so as to be tilted with respect to an imaginary plane perpendicular to a light axis of the light beam modulated by the first light modulation unit.

Incidentally, if the light beam modulated by the first light modulation unit is transmitted through the light transmissive substrate disposed so as to be tilted with respect to the imaginary plane perpendicular to the light axis of the light beam, the astigmatism of the projection optical device is increased.

In the invention, focusing attention on the astigmatism, the light transmissive substrate is disposed so as to be tilted with respect to the imaginary plane perpendicular to the light axis of the light beam modulated by the first light modulation unit. Thus, by transmitting the light beam modulated by the first light modulation unit through the light transmissive substrate, the astigmatism of the projection optical device can be increased in a biased direction in accordance with the tilt of the light transmissive substrate. Since the astigmatism is increased, it becomes possible to overlap the colors adjacent to each other in the display image in the biased direction to thereby make the boundary between the colors fuzzy, and thus, a preferable image can be displayed by making the color boundary inconspicuous.

In the projector of the above aspect of the invention, it is preferable that the plurality of pixels is arranged so that the pixels with the same color are arranged side by side along a first direction and the pixels with different colors are arranged side by side along a second direction perpendicular to the first direction, and the light transmissive substrate is parallel to a plane obtained by rotating the imaginary plane around an imaginary straight line extending along the first direction.

According to this configuration, since the light transmissive substrate is disposed in parallel to the plane obtained by rotating the imaginary plane around the imaginary straight line extending along the first direction, the astigmatism due to the light transmissive substrate can be increased along the second direction. Thus, the boundary between the colors can effectively be made fuzzy even in the light modulation device in which the pixels with the same color are arranged side by side along the first direction and the pixels with different colors are arranged side by side along the second direction.

In the projector of the above aspect of the invention, it is preferable that the plurality of pixels is arranged so that the pixels with different colors are disposed side by side in a first direction and a second direction perpendicular to the first direction.

According to this configuration, since the arrangement in which the pixels with different colors are disposed side by side in the first direction and the second direction perpendicular to the first direction, it is possible to make the color boundary inconspicuous to thereby display a preferable image even in the case of increasing the astigmatism in either of the first and second directions in a biased manner. Therefore, the freedom of tilting direction of the light transmissive substrate can be increased.

In the projector of the above aspect of the invention, it is preferable that the light modulation device is composed of the first light modulation unit alone.

According to this configuration, by configuring the light modulation device with the first light modulation unit alone, the configuration of the projector can be simplified compared to the case of configuring it with a plurality of units. For example, by including the three colors of red (R), green (G), and blue (B) in the colors of the pixels, a color image can be displayed by the first light modulation unit alone.

In the projector of the above aspect of the invention, it is preferable that the light modulation device includes a second light modulation unit having a plurality of pixels arranged, the pixels having the same color, and the projection optical device projects a light beam obtained by combining the light beam transmitted through the light transmissive substrate and a light beam modulated by the second light modulation unit.

According to this configuration, the light modulation device is provided with the first light modulation unit having the plurality of pixels with different colors arranged therein to thereby display a plurality of colors and the second light modulation unit having the plurality of pixels with the same color arranged therein to thereby display a single color. Thus, the colors displayed by the first light modulation unit and the second light modulation unit can optimally be set in accordance with the characteristics of the respective colors. It is possible to adopt the setting of, for example, displaying the color (specifically green (G)) having a significant influence on the sense of resolution by the second light modulation unit, or the setting of displaying the color (specifically blue (B)) having a significant influence on the product life of the light modulation device by the second light modulation unit.

In the projector of the above aspect of the invention, it is preferable that the light transmissive substrate is formed of a reflective polarization plate, and transmits the light beam modulated by the first light modulation unit while reflecting the light beam modulated by the second light modulation unit to thereby combine the light beam modulated by the first light modulation unit and the light beam modulated by the second light modulation unit.

According to this configuration, the light transmissive substrate is formed of the reflective polarization plate. Further, according to the polarization direction by transmitting the light beam modulated by the first light modulation unit while reflecting the light beam modulated by the second light modulation unit, the light beam modulated by the first light modulation unit and the light beam modulated by the second light modulation unit are combined with each other. Therefore, since the member for combining the light beam modulated by the first light modulation unit and the light beam modulated by the second light modulation unit with each other can be eliminated, the configuration of the projector can be simplified.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
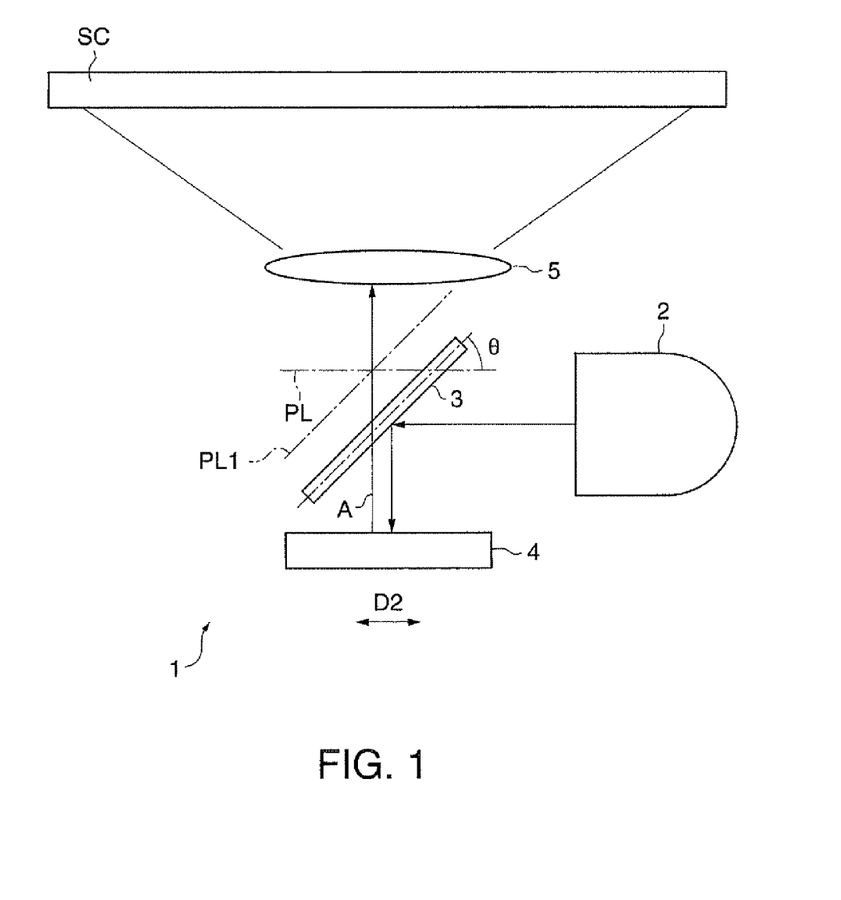
FIG. 1 is a diagram showing a schematic configuration of a projector according to a first embodiment of the invention.

The first embodiment of the invention will hereinafter be explained with reference to the accompanying drawings.
Schematic Configuration of Projector FIG. 1 is a diagram showing a schematic configuration of a projector according to the present embodiment. Specifically, FIG. 1 is a plan view showing the projector 1 viewed from above.

The projector 1 projects an image to thereby display a projection image on a screen SC.

As shown in FIG. 1, the projector 1 is provided with an illumination device 2 as a light source device, a polarization plate 3 as a light transmissive substrate, a liquid crystal display (LCD) 4 as a first light modulation unit, and a projection lens 5 as a projection optical device.
Configuration of Illumination Device Although the detailed explanation and drawing are omitted here, the illumination device 2 is provided with a light source lamp, a reflector, a collimating lens, a polarization conversion element, and so on, and converts a light beam emitted by the light source lamp into a light beam of linear polarized light having a first polarization direction S, and then outputs the light beam thus obtained to the polarization plate 3. Here, in FIG. 1, the first polarization direction S denotes a polarization direction perpendicular to the sheet of the drawing.
Configuration of Polarization Plate The polarization plate 3 is formed of a reflective polarization plate, and is disposed on a light path between the LCD 4 described later and the projection lens 5. Specifically, the polarization plate 3 is configured to have a transmission axis coinciding with a second polarization direction P, and transmits the light beam of linearly polarized light having the second polarization direction P while reflecting the light beam of the linearly polarized light having the first polarization direction S. It should be noted that the second polarization direction P denotes a polarization direction perpendicular to the first polarization direction S described above and, parallel to the sheet of the drawing in FIG. 1.
Configuration of LCD FIG. 2 is a front view of the LCD 4.

Figure 2:
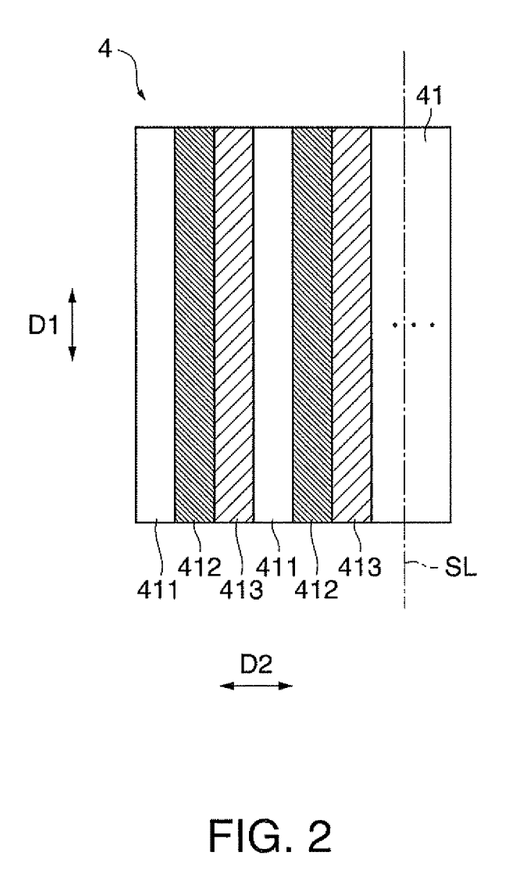
FIG. 2 is a front view of an LCD in the embodiment.

As shown in FIG. 2, the LCD 4 is provided with a plurality of pixels (not shown) arranged along a first direction D1 and a second direction D2 perpendicular to the first direction D1. It should be noted that the first direction D1 corresponds to the direction perpendicular to the sheet of the drawing in FIG. 1, and the second direction D2 corresponds to the lateral direction in FIG. 1.

In the detailed description, the LCD 4 is provided with a plurality of pixels for respectively displaying three colors of green (G), blue (B), and red (R) using a color filter 41. It should be noted that the color filter 41 can be either of a reflective color filter and an absorptive color filter.

In the LCD 4, the plurality of pixels is arranged so that the pixels with the same color are arranged side by side along the first direction D1 and the pixels with different colors are arranged side by side along the second direction D2. In other words, the plurality of pixels is arranged so that the colors are regularly arranged forming stripes using the color filter 41. More specifically, the plurality of pixels is arranged so that the three colors of lines extending in the first direction D1, namely a green (G) line 411, a blue (B) line 412, and a red (R) line 413, are repeatedly arranged side by side in the second direction D2 as shown in FIG. 2.

Further, as shown in FIG. 1, the LCD 4 modulates the incident light from the polarization plate 3, and then reflects the result toward the projection lens 5.

Here, as shown in FIG. 1, the polarization plate 3 described above is tilted with respect to an imaginary plane PL perpendicular to the light axis A of the light beam thus modulated by the LCD 4. More specifically, the polarization plate 3 is disposed in parallel to a plane (e.g., the plane PL1 shown in FIG. 1) obtained by rotating the imaginary plane PL around the imaginary straight line SL extending along the first direction D1 (FIG. 2). Specifically, as shown in FIG. 1, the polarization plate 3 is disposed with the tilt angle θ with respect to the imaginary plane PL set to 45 degrees.
Configuration of Projection Lens The projection lens 5 is positioned so that the back focal plane coincides with the LCD 4.

This projection lens 5 projects the light beam transmitted through the polarization plate 3 in an enlarged manner.
Operation of Projector Hereinafter, an operation of the projector 1 will be explained.

As described above, the illumination device 2 emits the light beam with the first polarization direction S toward the polarization plate 3. The polarization plate 3 reflects the light beam toward the LCD 4.

Under the control of the control device (not shown), the LCD 4 is controlled in the orientation state of the liquid crystal, modulates the polarization direction of the light beam reflected by the polarization plate 3, and reflects the result toward the projection lens 5. Out of the light beam reflected by the LCD 4, the light beam of the linearly polarized light with the second polarization direction P is transmitted through the polarization plate 3, and then enters the projection lens 5. The projection lens 5 projects the light beam transmitted through the polarization plate 3 on the screen SC in an enlarged manner.

In such a manner as described above, the projection image is displayed on the screen SC.

Here, as described above, the polarization plate 3 is installed with the tilt angle θ shown in FIG. 1 set to 45 degrees.

By disposing the polarization plate 3 thus tilted between the LCD 4 and the projection lens 5, the astigmatism of the projection lens 5 is increased as explained below.

Figure 3A:
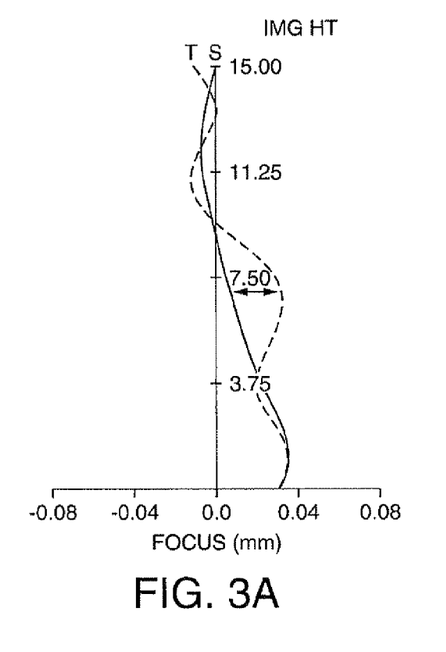
FIGS. 3A and 3B are astigmatism diagrams of a projection lens in the embodiment.
Figure 3B:
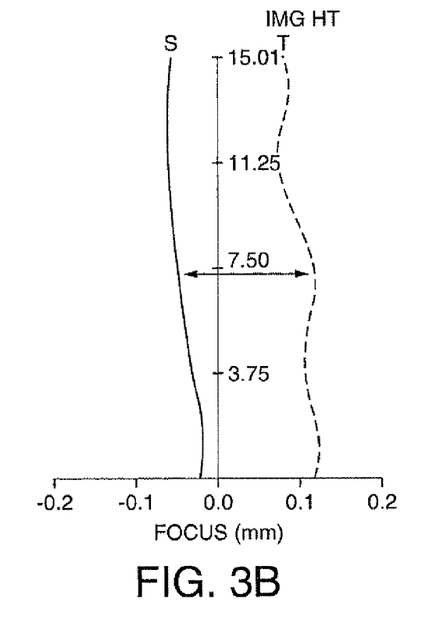

FIGS. 3A and 3B show astigmatism diagrams of the projection lens 5. Specifically, FIG. 3A shows the astigmatism in the first direction D1 in FIG. 2, and FIG. 3B shows the astigmatism in the second direction D2. It should be noted that the vertical axis in each of FIGS. 3A and 33 represents image height (IMG HT [mm]), and the horizontal axis thereof represents a distance (FOCUS [mm]) of the light axis A from the ideal image plane. Further, the broken lines labeled "T" corresponds to a tangential mage plane, and the solid line labeled "S" corresponds to a sagittal image plane.

As shown in FIGS. 3A and 3B, if the light beam is transmitted through the polarization plate 3, anisotropy is caused in the level of the astigmatism. In other words, the astigmatism in the second direction D2 shown in FIG. 3B becomes larger than the astigmatism in the first direction D1 shown in FIG. 3A. Specifically, the astigmatism (|T-S|) shown in FIG. 3A is equal to or smaller than about 0.03 mm while the astigmatism (|T-S|) shown in FIG. 3B is equal to or smaller than about 0.15 mm, which shows that the astigmatism in the second direction D2 is larger than the astigmatism in the first direction D1 with a bias of about five times.

Since such large astigmatism causes the defocus, the light emitted from a point on the LCD 4 spreads on the screen SC. Specifically, the light spreads in the second direction D2 to cause overlap in the boundary area between the images displayed by the respective pixels located in the lines adjacent to each other out of the images displayed by the pixels in the lines 411 through 413 described above. Thus, the boundary of the colors becomes fuzzy, and the color boundary becomes inconspicuous.

According to the first embodiment described above, the following advantages are obtained.

The polarization plate 3 is disposed so as to be tilted with respect to the imaginary plane PL perpendicular to the light axis A of the light beam modulated by the LCD 4. Thus, by transmitting the light beam modulated by the LCD 4 through the polarization plate 3, the astigmatism of the projection lens 5 can be increased in a biased direction in accordance with the tilt of the polarization plate 3. Since the astigmatism is increased, it becomes possible to overlap the colors adjacent to each other in the display image in the biased direction to thereby make the boundary between the colors fuzzy, and thus, a preferable image can be displayed by making the color boundary inconspicuous.

Specifically, since the polarization plate 3 is disposed in parallel to the plane obtained by rotating the imaginary plane PL around the imaginary straight line SL extending along the first direction D1, the astigmatism due to the polarization plate 3 can be increased along the second direction D2. Thus, the boundary between the colors can effectively be made fuzzy even in the LCD 4 in which the pixels with the same color are arranged side by side along the first direction D1 and the pixels with different colors are arranged side by side along the second direction D2.

Further, by configuring the light modulation device with the single LCD 4, the configuration of the projector 1 can be simplified compared to the case of configuring it with a plurality of LCDs. Further, by including the three colors of red (R), green (G), and blue (B) lathe colors of the pixels, a color image can be displayed by the single LCD 4.

Further, by disposing the polarization plate 3 so as to have the tilt angle θ of 45 degrees, the amount of the astigmatism due to the tilt of the polarization plate 3 can be made the largest. Further, by setting the tilt angle to 45 degrees, the members such as the illumination device 2, the LCD 4, and the projection lens 5 can efficiently be arranged.

Second Embodiment

Then, a second embodiment of the invention will be explained with reference to the accompanying drawings.

The present embodiment is different from the first embodiment of displaying a color image with the single LCD 4 in the point that there is provided a configuration of displaying a color image using a plurality of LCDs. It should be noted that in the explanation below, the part the same or substantially the same as the part having already been explained is denoted with the same reference symbol, and the explanation therefor will be omitted.

Schematic Configuration of Projector

Figure 4:
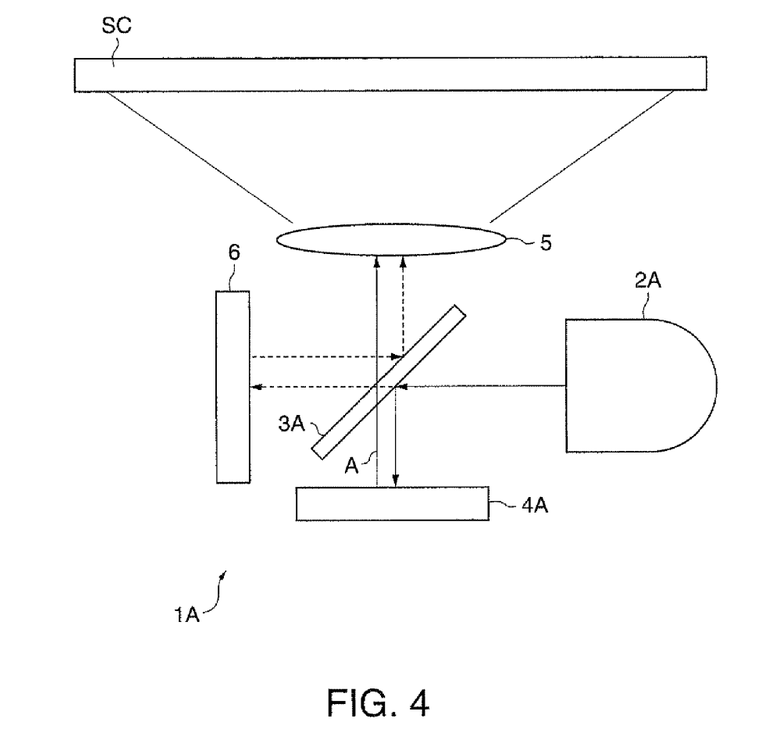
FIG. 4 is a diagram showing a schematic configuration of a projector according to a second embodiment of the invention.

FIG. 4 is a diagram showing a schematic configuration of a projector according to the present embodiment.

The projector 1A is provided with an illumination device 2A, a polarization plate 3A as a light transmissive substrate, a projection lens 5, a first LCD 4A as a first light modulation unit, and a second LCD 6 as a second light modulation unit.

The illumination device 2A emits a light beam of blue (B) light and red (R) light as a light beam of linearly polarized light having the first polarization direction S, and a light beam of green (G) light as a light beam of linearly polarized light having the second polarization direction P.

The polarization plate 3A is formed of a structured reflective polarization plate. Specifically, as the structured reflective polarization plate, a wire grid can be adopted. The wire grid performs polarization split on the light beam input thereto due to diffraction based on the grating structure. Specifically, the polarization plate 3A is configured to have a transmission axis coinciding with the second polarization direction P, and transmits the light beam of linearly polarized light having the second polarization direction P while reflecting the light beam of the linearly polarized light having the first polarization direction S.

Figure 5:
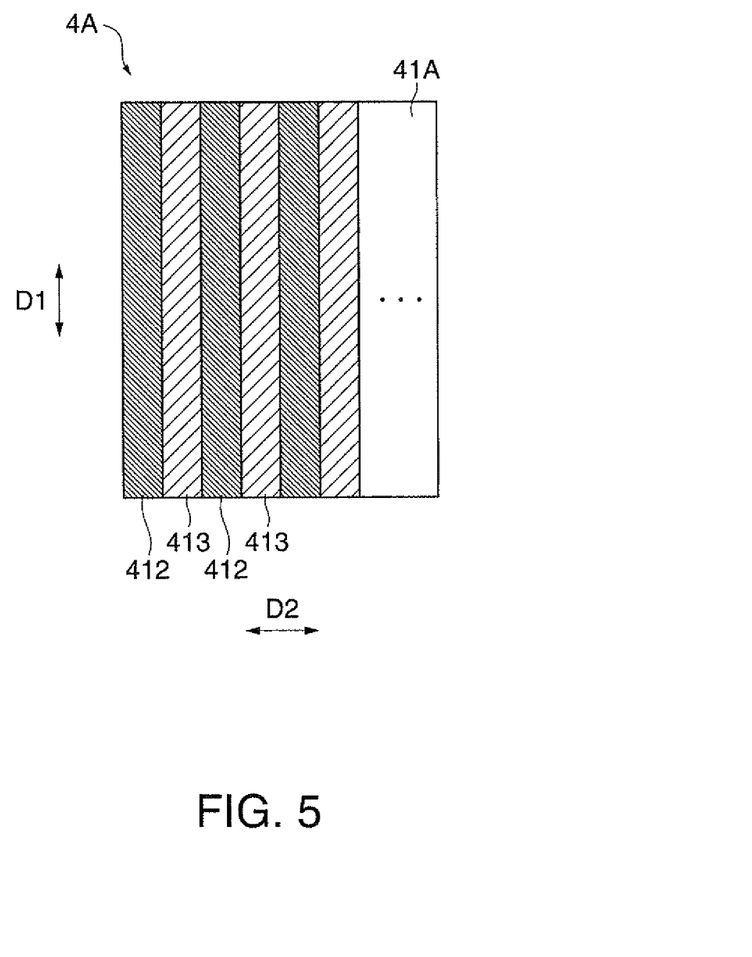
FIG. 5 is a front view of an LCD in the embodiment.

FIG. 5 is a front view of the first LCD 4A.

The first LCD 4A is provided with a plurality of pixels (not shown) for respectively displaying two colors of blue (B) and red (R.) using a color filter 41A. As shown in FIG. 5, the plurality of pixels is arranged so that the two colors of lines extending in the first direction D1, namely the blue (B) line 412, and the red (R) line 413, are repeatedly arranged side by side in the second direction D2. The rest of the configuration is substantially the same as that of the LCD 4 in the first embodiment.

The second LCD 6 is provided with a plurality of pixels (not shown) for displaying a single color of green (G).

The second LCD 6 modulates the incident light from the polarization plate 3A, and reflects the result toward the polarization plate 3A.

Operation of Projector

Hereinafter, an operation of the projector 1A, will be explained.

As described above, the illumination device 2A emits the light beam with the first polarization direction S and the light beam with the second polarization direction P toward the polarization plate 3A. The polarization plate 3A reflects the light beam with the first polarization direction S toward the first LCD 4A, and transmits the light beam with the second polarization direction P. The light beam transmitted through the polarization plate 3A enters the second LCD 6.

The first LCD 4A modulates the incident light from the polarization plate 3A, and reflects the result toward the projection lens 5. Out of the light beam modulated by the first LCD 4A, the light beam of the linearly polarized light with the second polarization direction P is transmitted through the polarization plate 3A, and then enters the projection lens 5.

On the other hand, the second LCD 6 modulates the incident light from the illumination device 2A transmitted through the polarization plate 3A, and reflects the result toward the polarization plate 3A. Out of the light beam modulated by the second LCD 6, the light beam of the linearly polarized light with the first polarization direction S is reflected by the polarization plate 3A, and then enters the projection lens 5.

Therefore, in the present embodiment, the color combination of blue (B) and red (R), and green (G) is performed by the polarization plate 3A, and the light beam obtained by the color combination enters the projection lens 5.

The projection lens 5 projects the light beam (the light beam after the color combination) input thereto on the screen SC in an enlarged manner.

In such a manner as described above, the projection image is displayed on the screen SC.

According to the second embodiment described above, the following advantages can be obtained besides the advantages substantially the same as those of the first embodiment.

The light modulation device is provided with the first LCD 4A having the plurality of pixels with different colors of blue (B) and red (R) arranged to thereby display the two colors of blue (B) and red (R), and the second LCD 6 having the plurality of pixels with the same color (green (G)) to thereby display the single color (green (G)). Thus, the colors displayed by the first LCD 4A and the second LCD 6 can optimally be set in accordance with the characteristics of the respective colors. Specifically, by adopting the setting of displaying green (G), which is felt by the human eyes with a preferable sense of resolution, by the second LCD 6, an image with a preferable sense of resolution can be displayed.

Further, the polarization plate 3A is formed of the reflective polarization plate. Further, the light beam modulated by the first LCD 4A is transmitted through the polarization plate 3A in accordance with the polarization direction, the light beam modulated by the second LCD 6 is reflected to thereby combine the light beam modulated by the first LCD 4A and the light beam modulated by the second LCD 6 with each other. Therefore, since the member for combining the light beam modulated by the first LCD 4A and the light beam modulated by the second LCD 6 with each other can be eliminated, the configuration of the projector 1A can be simplified.

Here, in the present embodiment, the structured polarization plate such as a wire grid is used as the polarization plate 3A. As described above, if the structured polarization plate such as a wire grid is used as the polarization plate 3A, image deterioration due to the level of the incident angle of the light beam entering the polarization plate 3A can be reduced. Thus, since the F-number can be set smaller (brighter), downsizing of the optical element such as the projection lens 5 can be achieved. Further, by using the structured polarization plate with a small variation in angular characteristic as the polarization plate 3A, a structure of a non-telecentric optical system can be adopted. Thus, downsizing of the projector 1 can be achieved by making the optical components have small sizes.

It should be noted that the invention is not limited to the embodiments described above, but includes modifications and improvements within a range where either of the advantages of the invention can be achieved.

Although in each of the embodiments the explanation is presented assuming that the tilt angle θ of the polarization plate 3, 3A is 45 degrees, the tilt angle θ is not limited to 45 degrees, but can be, for example, 30 degrees or 60 degrees.

Although in each of the embodiments the polarization plate 3, 3A is cited as an example of the tilted light transmissive substrate for generating the astigmatism, the light transmissive substrate is not limited thereto. For example, the light transmissive substrate can be an optical element such as a transparent substrate or a retardation plate. On this occasion, the polarization plate can be disposed in parallel to the LCD 4 (the first LCD 4A) (an exit surface of the light beam) with the tilt angle θ set to 0 degree.

Although in each of the embodiments described above the configuration in which the light axis A connecting the LCD 4 (the first LCD 4A) and the projection lens 5 to each other is a straight line is described as an example, the configuration is not a limitation. There can be adopted, for example, a configuration of disposing a mirror or the like between the LCD 4 (the first LCD 4A) and the projection lens 5 to thereby fold the light axis A in midstream.

Although in each of the embodiments the polarization plate 3, 3A is disposed as a new member, it is not a limitation. For example, the light transmissive substrate can be formed by tilting a polarization plate, a retardation plate, and so on used for other purposes instead of providing the polarization plate 3, 3A as a new member. Thus, there is no need for purposely providing a new member for the astigmatism, and therefore, the configuration of the projector 1 can be simplified.

Although in each of the embodiments the LCD 4 (the first LCD 4A) having the pixel colors arranged to form the stripes is cited as an example of the light modulation device, the configuration of the light modulation device in each of the embodiments is not limited thereto.

Figure 6A:
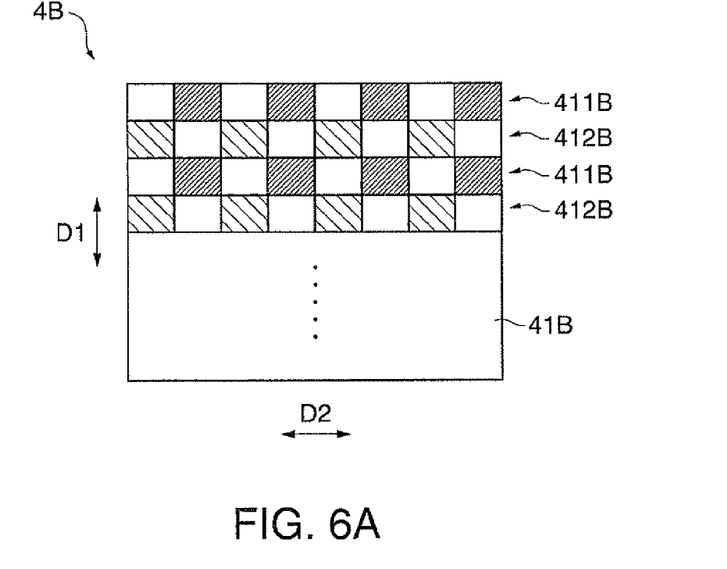
FIGS. 6A and 6B are front views of LCDs in modified examples of the embodiments mentioned above, respectively.
Figure 6B:
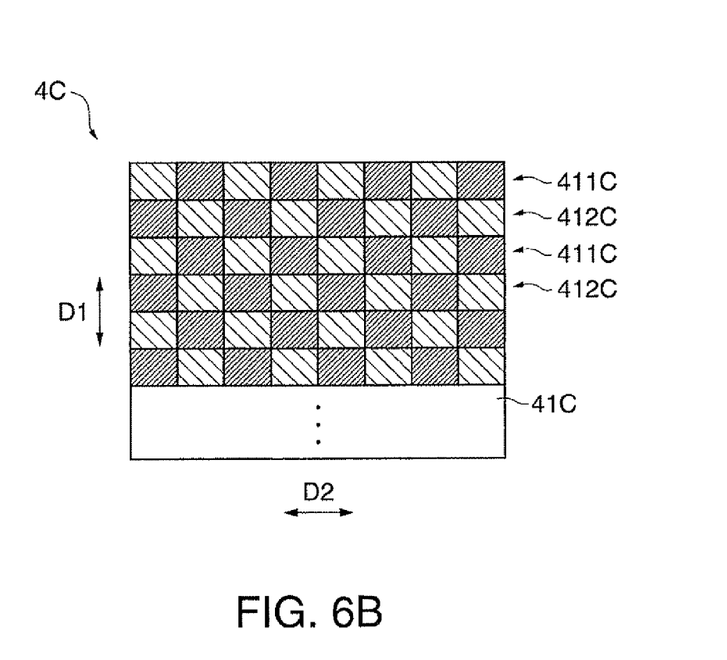

FIGS. 6A and 6B are front views of LCDs in modified examples of the embodiments described above, respectively. Specifically, FIG. 6A shows a modified example of the LCD 4 in the first embodiment, and FIG. 6B shows a modified example of the first LCD 4A in the second embodiment.

The LCD 4B shown in FIG. 6A is provided with a plurality of pixels for respectively displaying three colors of green (G), blue (B), and red (R) using a color filter 41B similarly to the LCD 4 of the first embodiment. In the LCD 4B, lines 411E each having green (G) and blue (B) pixels arranged alternately in the second direction D2, and lines 412B each having red (R) pixels and green (G) pixels arranged alternately in the second direction. D2 are arranged alternately in the first direction D1. It should be noted that the green (G) pixels are arranged so as to be shifted from each other between the line 411E and the line 412B in order to prevent the green (G) pixels from being located side by side.

This arrangement of the pixels is called a Bayer array, and is capable of enhancing the resolution of green (G) having a significant influence on the human eyes.

The LCD 4C shown in FIG. 6B is provided with pixels for respectively displaying two colors of blue (B) and red (R)

using a color filter 41C similarly to the first LCD 4A of the second embodiment. The LCD 4C has the blue (B) and red (R) pixels arranged checkerwise. In other words, the LCD 4C has the blue (B) and red (R) pixels arranged alternately in the first direction D1 and the second direction D2.

As described above, in the LCDs 4B, 4C shown in FIGS. 6A and 6B, the arrangement of disposing different colors adjacent to each other in the first direction D1 and the second direction D2 is adopted as the color arrangement by the plurality of pixels. Thus, it is possible to make the color boundary inconspicuous to thereby display a preferable image even in the case in which the astigmatism is increased in either of the first direction D1 and the second direction D2 in a biased manner. Therefore, the freedom of tilting direction of the polarization plate 3, 3A can be increased. Further, since the arrangement of the colors becomes finer compared to the striped arrangement in the first and second embodiments, the boundary between the colors is inconspicuous, and a more preferable image can be displayed.

Although in the second embodiment the configuration in which the polarization plate 3A also functions as the color combining optical device is adopted, this is not a limitation.

Figure 7:
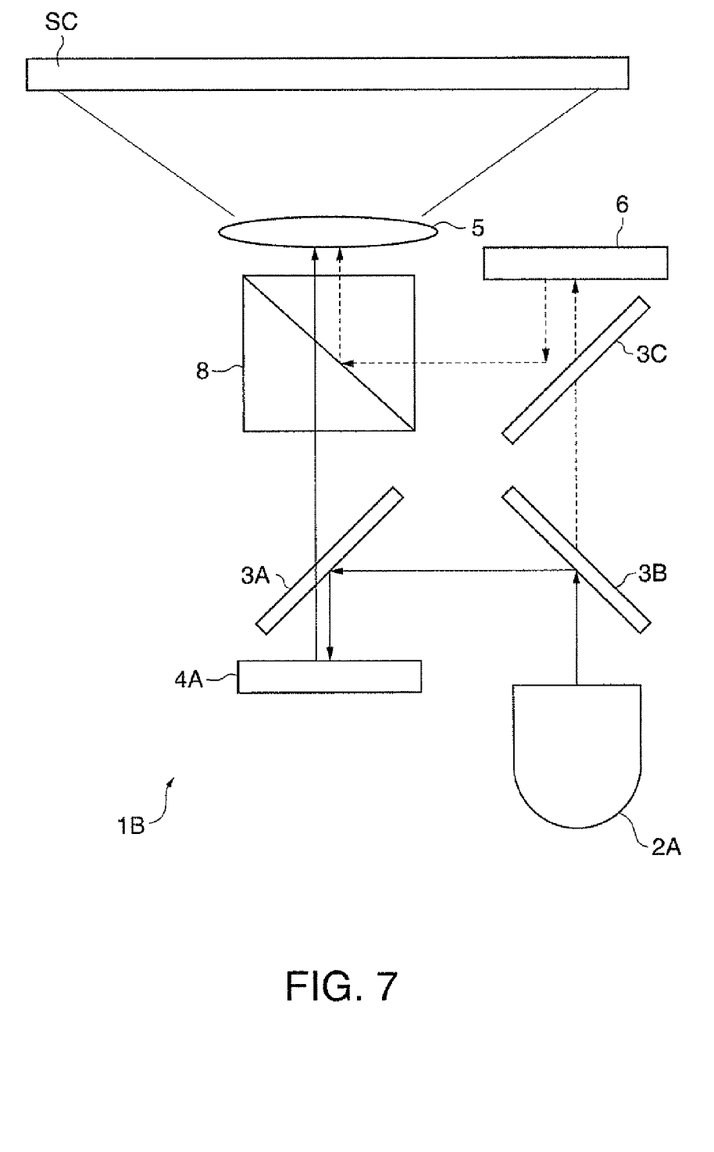
FIG. 7 is a diagram showing a schematic configuration of a projector according to a modified example of the second embodiment.

FIG. 7 is a diagram showing a schematic configuration of a projector according to a modified example of the second embodiment.

The projector 1B shown in FIG. 7 is further provided with polarization plates 3B, 3C each having substantially the same configuration as that of the polarization plate 3A, and a PBS 8 as the color combining optical device in addition to the constituents of the projector 1A according to the second embodiment.

The polarization plate 3B is for splitting the light beam of blue (B) and red (R) light, and the light beam of green (G) light. Further, the polarization plate 3C is a polarization plate dedicated to the light beam of green (G) light. It should be noted that the polarization plate 3A in the present modified example is a polarization plate for the light beam of blue (B) and red (R) light.

As described above, since the projector 1B according to this modified example, unlike the projector 1A according to the second embodiment, does not use the polarization plate in common for the green (G) light and the blue (B) and red (R) light, but uses the polarization plate 3C dedicated to the light beam of the green (G) light, the image quality such as a sense of contrast can be improved.

Although in the second embodiment there is adopted the configuration of displaying blue (B) and red (R) using the first LCD 4A and displaying green (G) using the second LCD 6, this is not a limitation. For example, since the temperature of the first LCD 4A for displaying two colors tends to be higher than the temperature of the second LCD 6 for displaying a single color, by adopting the setting of displaying blue (B), which is located on the short wavelength side compared to other colors, and easily deteriorates the LCD, using the second LCD 6 while displaying the other colors with the first LCD 4A, the product life of the first LCD 4A can be elongated.

Although in each of the embodiments the configuration in which the reflective LCDs 4, 4A, 6 are used as the light modulation device is explained, the light modulation device is not limited to the reflective type, but can be a light transmissive type. Further, the projector according to the invention can also have a configuration provided with both of the reflective light modulation device and the light transmissive light modulation device.

In the first embodiment, there is cited the projector 1 for displaying the three colors of red (R), green (G), and blue (B) with the single LCD 4. Further, in the second embodiment there is cited the projector 1A for displaying red (R) and blue (B) using the first LCD 4A and displaying green (G) using the second LCD 6. However, the configuration of the projector according to the invention is not limited thereto. For example, the colors and the combination of the colors displayed with the respective light modulation devices are not limited to those of each of the embodiments described above, but various combinations such as four color display with two light modulation devices can be adopted.

The invention can be applied to a projector used for presentations and a home theater.

The entire disclosure of Japanese Patent Application No. 2011-021448, filed Feb. 3, 2011 is expressly incorporated by reference herein.

What is claimed is:

1. A projector comprising:
a light source device;
a first light modulation device adapted to modulate a light beam emitted from the light source device;
a second light modulation device adapted to modulate a light beam emitted from the light source device;
a light transmissive substrate adapted to transmit the light beam modulated by the first light modulation device; and
a projection optical device adapted to project the light beam transmitted through the light transmissive substrate,
wherein the first light modulation device includes a first light modulation unit having a plurality of pixels with different colors blue and red arranged side by side along a second direction,
the second light modulation device includes a second light modulation unit having a plurality of pixels with a same color green arranged side by side along a first direction perpendicular to the second direction, an astigmatism in the second direction being larger than an astigmatism in the first direction, and
the light transmissive substrate is disposed so as to be tilted with respect to an imaginary plane perpendicular to a light axis of the light beam modulated by the first light modulation unit.

2. The projector according to claim 1, wherein
the first light modulation device is composed of the first light modulation unit alone.

3. The projector according to claim 1, wherein
the projection optical device projects a light beam obtained by combining the light beam transmitted through the light transmissive substrate and a light beam modulated by the second light modulation device.

4. The projector according to claim 3, wherein
the light transmissive substrate is formed of a reflective polarization plate, and transmits the light beam modulated by the first light modulation device while reflecting the light beam modulated by the second light modulation device to thereby combine the light beam modulated by the first light modulation device and the light beam modulated by the second light modulation device.

5. A projector comprising:
a light source device;
a light modulation device adapted to modulate a light beam emitted from the light source device;
a light transmissive substrate adapted to transmit the light beam modulated by the light modulation device; and
a projection optical device adapted to project the light beam transmitted through the light transmissive substrate, wherein the light modulation device includes a first light modulation unit having a plurality of pixels arranged, the pixels having colors different from each other, the light transmissive substrate is disposed so as to be tilted with respect to an imaginary plane perpendicular to a light axis of the light beam modulated by the first light modulation unit, and is formed of a reflective polarization plate, the plurality of pixels is arranged so that pixels with the same color are arranged side by side along a first direction and pixels with different colors are arranged side by side along a second direction perpendicular to the first direction, an astigmatism in the second direction being larger than an astigmatism in the first direction, the light transmissive substrate is parallel to a plane obtained by rotating the imaginary plane around an imaginary straight line extending along the first direction, and the reflective polarization plate is configured to reflect the light beam of a first linearly polarized light having a first polarization direction along the first direction and is configured to transmit the light beam of a second linearly polarized light having a second polarization direction along the second direction.

* * * * *